United States Patent
Li et al.

(10) Patent No.: US 7,652,624 B2
(45) Date of Patent: Jan. 26, 2010

(54) MILLIMETER-WAVE COMMUNICATION STATIONS WITH DIRECTIONAL ANTENNAS AND METHODS FOR FAST LINK RECOVERY

(75) Inventors: Guoqing C. Li, Portland, OR (US); Kristoffer D Fleming, Chandler, AZ (US); Richard D. Roberts, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 11/682,658

(22) Filed: Mar. 6, 2007

(65) Prior Publication Data

US 2008/0218413 A1 Sep. 11, 2008

(51) Int. Cl.
*H04B 7/00* (2006.01)
*H04W 4/00* (2006.01)
(52) U.S. Cl. .................. 342/367; 370/328
(58) Field of Classification Search ............... 342/361, 342/367; 370/328, 329, 331, 338; 455/67.14, 455/452.1, 513
See application file for complete search history.

(56) References Cited

U.S. PATENT DOCUMENTS

2003/0048770 A1 3/2003 Proctor, Jr.

2005/0152303 A1 7/2005 Li et al.
2005/0233771 A1 10/2005 Aflalo et al.
2005/0267550 A1 12/2005 Hess et al.
2006/0171357 A1 8/2006 King et al.

FOREIGN PATENT DOCUMENTS

WO WO-2008109525 A1 9/2008

OTHER PUBLICATIONS

"International Application Serial No. PCT/US2008/055660, Search Report mailed Jul. 11, 2008", 6 pgs.
"International Application Serial No. PCT/US2008/055660, Written Opinion mailed Jul. 11, 2008", 6 pgs.

*Primary Examiner*—Dao L Phan
(74) *Attorney, Agent, or Firm*—Schwegman, Lundberg & Woessner, P.A.; Gregory J. Gorrie

(57) ABSTRACT

Embodiments of millimeter-wave communication stations with directional antennas and methods for fast link recovery are generally described herein. Other embodiments may be described and claimed. In some embodiments, a transmitting station retransmits a packet in an adjacent direction when an acknowledgement is not received from a receiving station after a number of retransmission attempts. In other embodiments, a receiving station changes its reception to an adjacent direction when a packet is not received from a transmitting station after a number of missed reservations.

22 Claims, 5 Drawing Sheets

MILLIMETER-WAVE COMMUNICATION STATIONS WITH DIRECTIONAL ANTENNAS AND METHODS FOR FAST LINK RECOVERY

TECHNICAL FIELD

Some embodiments pertain to wireless communications. Some embodiments pertain to communication with directional antennas at millimeter-wave frequencies.

BACKGROUND

Many conventional wireless devices communicate using radio frequencies (RF) that generally range between two and eleven gigahertz (GHz). These systems generally employ either omnidirectional or lower-directivity antennas, primarily because of the comparatively long wavelengths of the frequencies and relatively low path loss. The lower directivity of these antennas may limit the throughput of such systems over longer ranges.

Due to the high path loss associated with communicating using millimeter-waves, highly directional antennas with large apertures are generally used. Highly directional antennas may be smaller and more compact at millimeter-wave frequencies and could improve the throughput of these systems. These highly directional antennas may make it difficult to establish and maintain communication links between wireless devices, particularly when the wireless devices are mobile. Furthermore, these highly directional antennas may make it difficult to quickly reestablish a link that has been lost due to movement or rotation of one of the devices.

Thus, there are general needs for methods and wireless devices that use highly directional antennas that can quickly reestablish communication links. There are also needs for methods and wireless devices that can communicate with a higher throughput.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
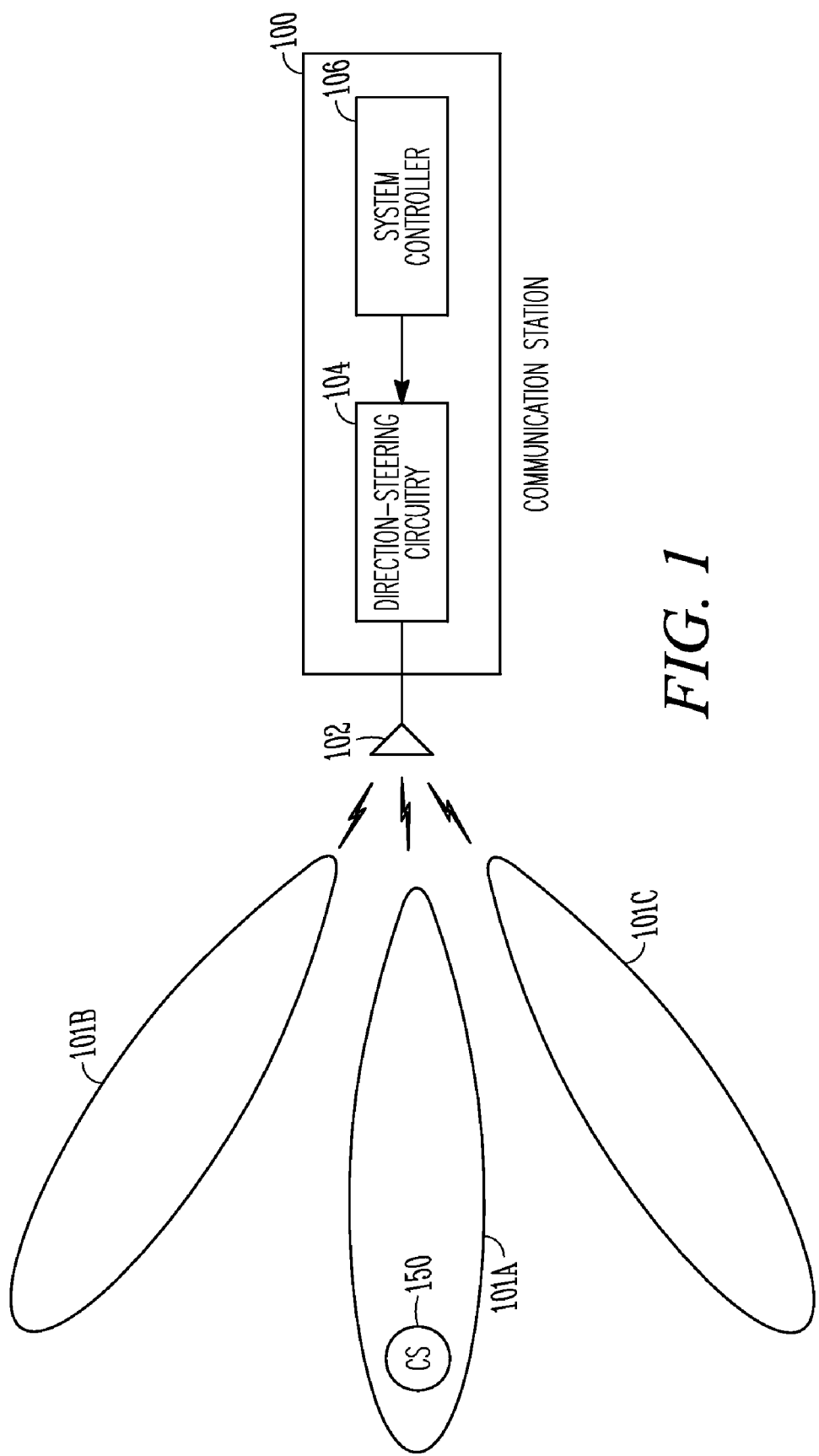
FIG. 1 is a block diagram of a communication station in accordance with some embodiments of the present invention.

FIG. 1 is a block diagram of a communication station in accordance with some embodiments of the present invention. Communication station 100 may communicate with one or more other communication stations, such as communication station (CS) 150 using directional antenna 102. In some embodiments, communication stations 100 and 150 may use millimeter-wave signals for communicating, although the scope of the invention is not limited in this respect. In some embodiments, communication stations 100 and 150 may operate as part of a peer-to-peer (P2P) network. In other embodiments, communication stations 100 and 150 may operate as part of a mesh network, in which communications may include packets routed on behalf of other wireless devices of the mesh network.

In accordance with some embodiments of the present invention, communication stations 100 and 150 may select directions for communicating with each other using directional antenna 102 to help maximize one or more link parameters. Some of these embodiments may be particularly suitable for non-line of sight (NLOS) millimeter-wave communications.

In accordance with some embodiments, communication station 100 may comprise direction-steering circuitry 104 coupled to directional antenna 102 to transmit packets in one of directions 101A, 101B or 101C for receipt by communication station 150. Communication station 100 may also comprise system controller 106 to select and/or determine the direction of transmission and reception by directional antenna 102, as well as to perform other functions and procedures discussed in more detail below. In these embodiments, communication station 100 may be termed a transmitting station, and communication station 150 may be termed a receiving station. Although not explicitly shown, communication station 150 may be similar to communication station 100 and may include direction-steering circuitry coupled to a directional antenna, and a system controller, among other things. In some embodiments, either communication station 100 or communication station 150 may operate as a transmitting station, and either communication station 100 or communication station 150 may operate as a receiving station.

In some embodiments, direction-steering circuitry 104 may change the direction of an antenna beam using a beam-steering technique. In other embodiments, direction-steering circuitry 104 may change the direction of an antenna beam by selecting a different sector of a sectorized antenna. These embodiments are discussed in more detail below.

One issue with the use of directional antennas by communication stations 100 and 150 is that an established communication link may be lost due to the movement and/or rotation of either communication station. This is illustrated in FIGS. 2A and 2B.

Figure 2A:
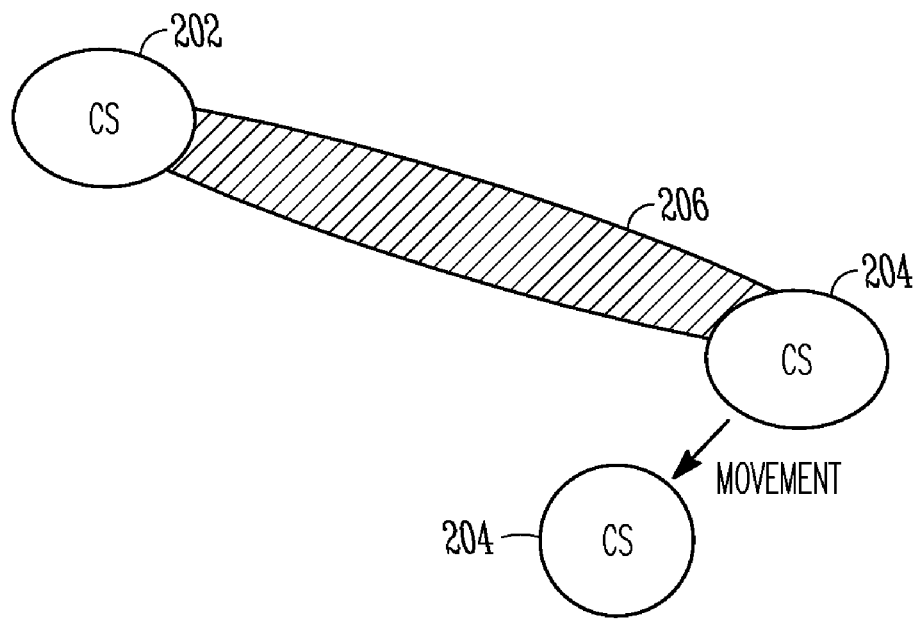
FIG. 2A illustrates the loss of connection due to device mobility.

FIG. 2A illustrates the loss of connection due to device mobility. In FIG. 2A, established communication link 206 between communication station (CS) 202 and communication station 204 may be lost due to movement of communication station (CS) 204. Communication station 202 and communication station 204 may correspond to either communication station 100 or communication station 150.

Figure 2B:
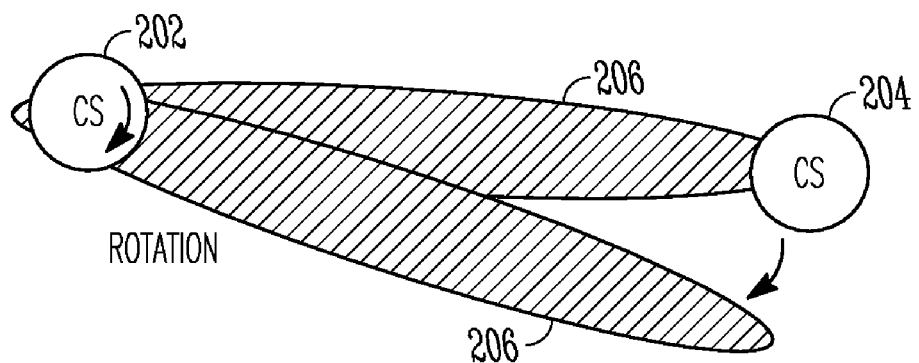
FIG. 2B illustrates the loss of connection due to device rotation.

FIG. 2B illustrates the loss of connection due to device rotation. In FIG. 2B, established communication link 206 between communication station (CS) 202 and communication station (CS) 204 may be lost due to rotation of communication station 202. As a result of the rotation of communication station 202, the antenna beam is no longer directed at communication station 204.

Referring back to FIG. 1, to quickly reestablish communications, communication station 100 and/or communication station 150 may perform procedures for fast link recovery. These embodiments are discussed in more detail below.

In some embodiments, the transmitting station (e.g., communication station 100) may keep track of a retry counter which tracks the number retransmissions. In these embodiments, when the retry counter reaches a threshold, rather than dropping the packet and initiating a device discovery process, the packet may be transmitted in one or more adjacent directions (e.g., direction 101B or direction 110C). When an acknowledgement (ACK) is received in one of the adjacent directions, the transmitting station may update its location information for that receiving station. When an ACK is not received in one of the adjacent directions after a number of retransmissions, the packet may be dropped and the device discovery process may be initiated. These embodiments are discussed in more detail below.

In some embodiments, the transmitting station and receiving station may set up a periodic channel reservation to communicate data from the transmitting station to the receiving station. In these embodiments, the receiving station (e.g., communication station 100) may expect to receive data within a regularly occurring channel reservation slot. In accordance with some embodiments, when the receiving station does not receive a packet from the transmitting station after a number of channel reservation slots, the receiving station may change its receiving direction (e.g., direction 101A) to attempt to receive the packet in one or more adjacent directions (e.g., direction 101B or direction 101C). If the packet is received in one of the adjacent directions, the receiving station may update the location information for the transmitting station. If the packet is not received in one of the adjacent directions, the reservation may be discarded and a device discovery process may be initiated. These embodiments are discussed in more detail below.

Accordingly, when a link is lost, fast link recovery may be achieved. In some embodiments, different policies and/or thresholds may be applied by each communication station to trigger the link recover process. In some other embodiments, either the transmitting station or the receiving station may perform a link recovery process, which may be negotiated by the communication stations. These embodiments are discussed in more detail below.

Directional antenna 102 may comprise one or more directional antennas, including, for example, dipole antennas, monopole antennas, patch antennas, loop antennas, microstrip antennas, or other types of directional antennas suitable for transmission of millimeter-wave signals. In some embodiments, instead of two or more antennas, a single antenna with multiple apertures may be used. In these embodiments, each aperture may be considered a separate antenna. In some embodiments, directional antenna 102 may comprise one or more phased-array antennas.

In some embodiments, directional antenna 102 may comprise a millimeter-wave chip-array reflector antenna having a millimeter-wave reflector to shape and reflect an incident antenna beam, and a chip-array antenna having an array of antenna elements to generate and scan the incident antenna beam over a surface of the reflector to provide a steerable antenna beam. In these embodiments, the antenna beam may be directed in a selected one of a plurality of directions, such as directions 101A, 101B, and 101C. It should be noted that the antenna beams of directional antenna 102 may provide broader coverage regions than the shaded regions illustrated in FIG. 1.

In some alternate embodiments, directional antenna 102 may comprise a chip-lens array antenna system having a millimeter-wave lens and a chip-array antenna to generate and direct an incident beam of millimeter-wave signals through the millimeter-wave lens for subsequent transmission. In these embodiments, the antenna beam may be directed in a selected one of a plurality of directions, such as directions 101A, 101B, and 101C.

Although communication station 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of communication station 100 may refer to one or more processes operating on one or more processing elements.

In some embodiments, communication stations 100 and 150 may communicate using the millimeter-wave signals comprising millimeter-wave frequencies between approximately 57 and 90 gigahertz (GHz). In some embodiments, the millimeter-wave signals may be multicarrier signals. These embodiments are discussed in more detail below. Although many embodiments of the present invention are directed to using millimeter-wave signals, the scope of the invention is not limited in this respect as other frequencies may also be suitable.

In some embodiments, communication stations 100 and 150 may communicate millimeter-wave signals in accordance with specific communication standards or proposed specifications, such as the Institute of Electrical and Electronics Engineers (IEEE) standards including the IEEE 802.15 standards and proposed specifications for millimeter-wave communications (e.g., the IEEE 802.15 task group 3c 'Call For Intent' (CFI) dated December 2005), although the scope of the invention is not limited in this respect as they may also be suitable to transmit and/or receive communications in accordance with other techniques and standards. For more information with respect to the IEEE 802.15 standards, please refer to "IEEE Standards for Information Technology—Telecommunications and Information Exchange between Systems"—Part 15.

In some embodiments, either communication station 100 or 150 may comprise a wireless local area network (WLAN) communication station including Wireless Fidelity (WiFi) communication station, an access point (AP) or a mobile station (MS) that communicates using millimeter-wave communication signals. In some embodiments, communication stations 100 and 150 may communicate using multicarrier signals, such as orthogonal frequency division multiplexed (OFDM) signals, comprising a plurality of subcarriers at millimeter-wave frequencies. In some embodiments, directional antenna 102 may be mounted on a ceiling or a wall of a room for indoor applications, or on a wall, a pole, or a tower for outdoor applications.

In some other embodiments, communication stations 100 and 150 may be part of a broadband wireless access (BWA) network communication station, such as a Worldwide Interoperability for Microwave Access (WiMax) communication station that communicates using millimeter-wave communication signals, although the scope of the invention is not limited in this respect as communication stations 100 and 150 may be part of almost any wireless communication station. In some embodiments, communication stations 100 and 150 may communicate using a multiple access technique, such as orthogonal frequency division multiple access (OFDMA). In these embodiments, communication stations 100 and 150 may communicate using millimeter-wave signals comprising a plurality of subcarriers at millimeter-wave frequencies.

In some other embodiments, communication stations 100 and 150 may be part of a wireless communication device that may communicate using spread-spectrum signals, although the scope of the invention is not limited in this respect. In some alternate embodiments, single carrier signals may be used. In some of these embodiments, single carrier signals with frequency domain equalization (SC-FDE) using a cyclic extension guard interval may also be used, although the scope of the invention is not limited in this respect.

As used herein, the terms 'beamwidth' and 'antenna beam' may refer to regions for either reception and/or transmission of millimeter-wave signals. Likewise, the terms 'generate' and 'direct' may refer to either the reception and/or transmission of millimeter-wave signals. As used herein, either communication station 100 or communication station 150 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Figure 3:
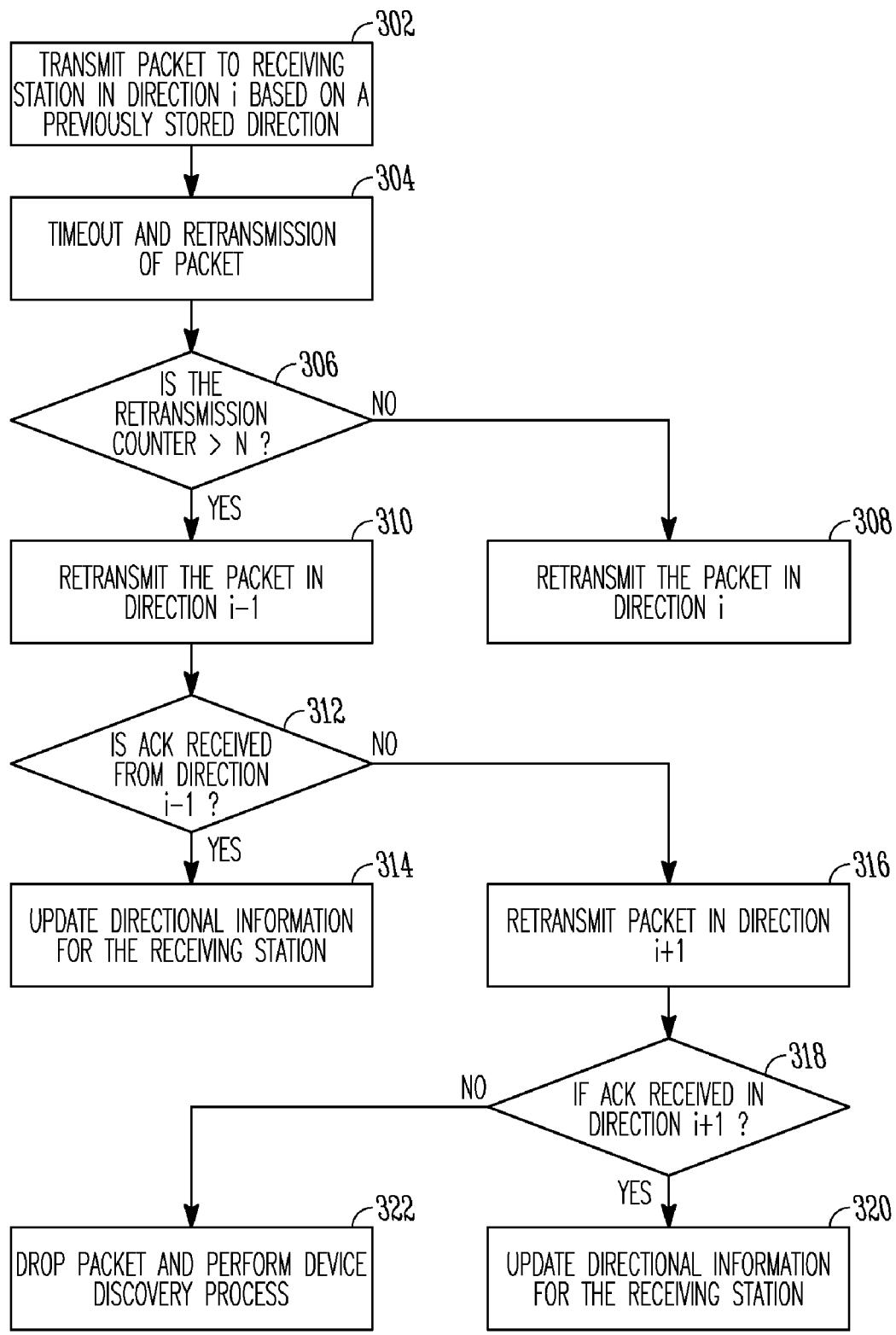
FIG. 3 is a flow chart of a procedure for fast link recovery performed by a transmitting station in accordance with some embodiments of the present invention.

FIG. 3 is a flow chart of a procedure for fast link recovery performed by a transmitting station in accordance with some embodiments of the present invention. The procedure for fast link recovery illustrated in FIG. 3 may be performed by communication station 100 (FIG. 1) when operating as a transmitting station for transmitting a packet to communication station 150 (FIG. 1) operating as a receiving station.

Referring to FIGS. 1 and 3, in operation 302, the transmitting station may transmit a packet at millimeter-wave frequencies with directional antenna 102 in first direction 101A to a receiving station. The first direction may be an initial direction and may have been determined by performing a device discovery process. In procedure 300, first direction 101A may be referred to direction 'i', second direction 101B may be referred to as direction 'i−1', and third direction 101C may be referred to as direction 'i+1'.

In operation 304, a timeout occurs when an acknowledgement is not received in a certain amount of time and the packet is retransmitted in first direction 101A. Operation 306 determines when the number of retransmissions exceeds a predetermined number (e.g., N). In some embodiments, operation 306 may use a retransmission counter. Operation 308 comprises retransmitting the packet in first direction 101A until the number of retransmissions exceeds the predetermined number. When an acknowledgement is not received from the receiving station acknowledging receipt of the transmitted packet after the predetermined number of retransmissions in first direction 101A, operation 310 is performed. In operation 310, the packet is retransmitting in second direction 101B. N may range from 10 or less to up to 1000 or more.

After retransmitting the packet in second direction 101B in operation 310, the transmitting station may wait for an acknowledgement from the receiving station in second direction 101B by receiving in second direction 101B with directional antenna 102. In operation 312, when an acknowledgement from the receiving station is received in second direction 101B in response to the retransmission in second direction 101B in operation 310, operation 314 is performed. In operation 314, directional information is updated for the receiving station for subsequent communications in second direction 101B.

When an acknowledgement from the receiving station is not received in second direction 101B after a predetermined number of retransmission attempts in second direction 101B, operation 316 is performed. In operation 316 the packet is retransmitted in third direction 101C. In these embodiments, second and third directions 101B & 101C may be on opposite sides of first direction 101A in a horizontal plane, as illustrated in FIG. 1, although the scope of the invention is not limited in this respect. In some embodiments, the second and third directions 101B & 101C may be vertically offset and/or horizontally offset with respect to first direction 101A.

After retransmitting the packet in third direction 101C in operation 316, the transmitting station may wait for an acknowledgement from the receiving station in third direction 101C by receiving in third direction 101C with directional antenna 102.

Operation 318 comprises determining if an acknowledgement from the receiving station is received from third direction 101C. When an acknowledgement from the receiving station is received from third direction 101C, operation 320 is performed. Operation 320 comprises updating directional information for the receiving station for subsequent communications in third direction 101C. When the acknowledgement from the receiving station is not received from third direction 101C after a predetermined number of retransmission attempts in third direction 101C, operation 322 is performed. In operation 322, the packet may be dropped and a device discovery process may be initiated.

In some embodiments, prior to transmitting the packet in first direction 101A to the receiving station in operation 302, a device discovery process may also be performed which may identify the initial direction associated with the receiving station. In these embodiments, the directional information for the receiving station may be updated for subsequent communications with the receiving station in the identified direction. In some embodiments, device discovery processes may be performed in all directions with several directional antennas, a sectorized antenna, or an omnidirectional antenna. In some embodiments, the receiving station may be configured to attempt to receive the packet within a periodic reservation from the transmitting station for at least a number of times equaling the predetermined numbers of retransmissions by a transmitting station in first, second and third directions 101A, 101B & 101C. In some embodiments, the receiving station and/or the transmitting station may determine the number of retransmissions when setting up a periodic reservation, although the scope of the invention is not limited in this respect.

In some embodiments, when transmitting in first direction 101A in operations 302 and 308, a first set of beamforming coefficients may be applied to direction-steering circuitry 104 to generate millimeter-wave transmissions in first direction 101A. When retransmitting in second direction 101B in operation 310, a second set of beamforming coefficients may be applied to direction-steering circuitry 104 to generate millimeter-wave transmissions in second direction 101B. When retransmitting in third direction 101C in operation 316, a third set of beamforming coefficients may be applied to direction-steering circuitry 104 to generate millimeter-wave transmissions in third direction 101C.

In these embodiments, for receiving acknowledgements from the receiving station, the first set of beamforming coefficients may be applied to direction-steering circuitry 104 to receive an acknowledgement from first direction 101A. For receiving acknowledgements from the receiving station in second direction 101B, the second set of beamforming coefficients may be applied to direction-steering circuitry 104. For receiving acknowledgements from the receiving station in the third direction 101C, the third set of beamforming coefficients may be applied to direction-steering circuitry 104.

Figure 5:
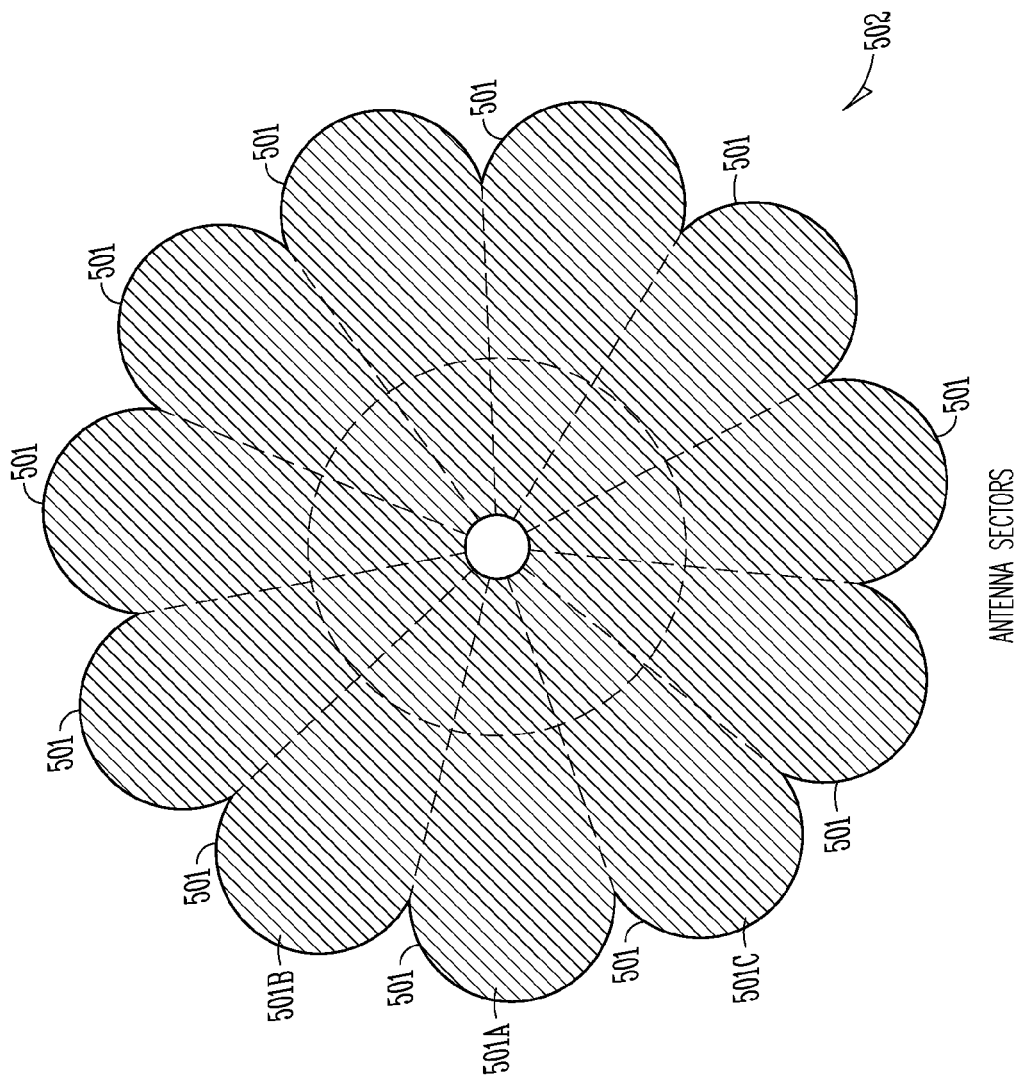
FIG. 5 illustrates the operation of a sectorized antenna in accordance with some embodiments of the present invention.

In some alternate embodiments, a sectorized antenna is used for directional antenna 102. In these embodiments, beamforming coefficients may not be necessary. An example of a sectorized antenna is illustrated in FIG. 5 discussed below.

In some frequency division multiplexed (FDM) embodiments, transmissions and retransmissions by directional antenna 102 may be transmitted on a first frequency channel, and the acknowledgements may be received on a second frequency channel orthogonal to the first frequency channel. In some time-division multiplexed (TDM) embodiments, transmissions and retransmissions by directional antenna 102 may be transmitted on a frequency channel within first time slots, and the acknowledgements may be received on the same frequency channel within second time slots orthogonal to the first time slots.

In some multicarrier embodiments, transmissions and retransmissions by directional antenna 102 may comprise OFDM transmissions. In some other embodiments, transmissions and retransmissions by directional antenna 102 may comprise single carrier signals. In some of these single carrier embodiments, frequency-domain equalization may be performed.

Figure 4:
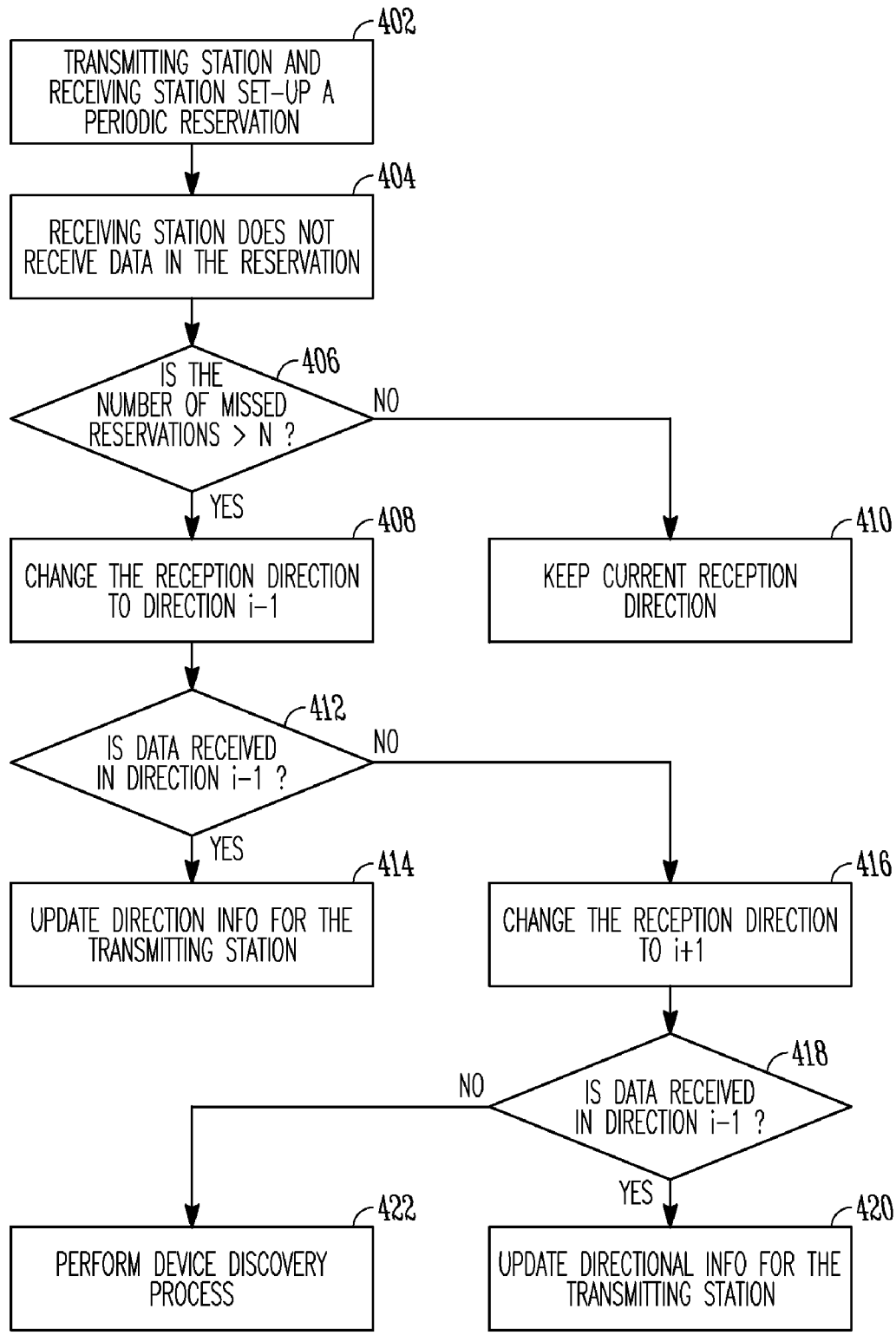
FIG. 4 is a flow chart of a procedure for fast link recovery performed by a receiving station in accordance with some embodiments of the present invention.

FIG. 4 is a flow chart of a procedure for fast link recovery performed by a receiving station in accordance with some embodiments of the present invention. The procedure for fast link recovery illustrated in FIG. 4 may be performed by communication station 100 when operating as a receiving station for receiving a packet from communication station 150 (FIG. 1) operating as a transmitting station.

Referring to FIGS. 1 and 4, in operation 402, the transmitting station and the receiving station may set up a periodic reservation to reserve bandwidth on a regular basis for the communication of the data packets directed to the receiving station. As part of operation 402, the receiving station may have determined an initial or first direction for use in receiving the packets from the transmitting station. In procedure 400, first direction 101A may be referred to direction 'i', second direction 101B may be referred to as direction 'i−1', and third direction 101C may be referred to as direction 'i+1'.

In operation 404, the receiving station attempts to receive a packet in first direction 101A from the transmitting station based on the periodic reservation request using directional antenna 102. Operation 406 determines the number of missed reservations in which a packet is not received. After a predetermined number (i.e., N) of missed reservations, operation 408 is performed. In operation 408, the receive direction of directional antenna 102 may be changed to second direction 101B and the receiving station attempts to receive the packet in second direction 101B in operation 412. In operation 408, prior to changing the receive direction to second direction 101B, operation 410 may comprise keeping the current reception direction and continuing to attempt to receive the packet in first direction 101A from the transmitting station until the predetermined number of missed reservations occur.

When the packet is received in second direction 101B, directional information associated with the transmitting station is updated in operation 414 to allow subsequent communications to be received in second direction 101B.

When the packet is not received in second direction 101B after a predetermined number of missed reservations as determined in operation 412, operation 416 is performed. In operation 416, the receive direction of directional antenna 102 is changed to third direction 101C and the receiving station attempts to receive the packet in third direction 101C in operation 418. When the packet is received in third direction 101C, operation 420 is performed. In operation 420, the directional information associated with the transmitting station is updated to allow subsequent communications to be received in third direction 101C. When the packet is not received in third direction 101C after the predetermined number of missed reservations, a device discovery process may be performed in operation 422.

In some embodiments, the transmitting station may retransmit the packet to the receiving station for at least a number of times equaling the predetermined numbers of missed reservations in first, second and third directions 101A, 101B & 101C. In some embodiments, the receiving station and/or the transmitting station may determine the predetermined numbers of missed reservations in first, second and third directions 101A, 101B & 101C when setting up the periodic reservation, although the scope of the invention is not limited in this respect.

In some embodiments, the receiving station may apply sets of beamforming coefficients to direction-steering circuitry 104 to receive in different directions. In other embodiments that use a sectorized antenna, the receiving station may receive with different portions of the sectorized antenna.

Although the individual operations of the procedures illustrated in FIGS. 3 & 4 are illustrated and described as separate operations, one or more of the individual operations may be performed concurrently, and nothing requires that the operations be performed in the order illustrated. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

FIG. 5 illustrates the operation of a sectorized antenna in accordance with some embodiments of the present invention.

Sectorized antenna 502 may be suitable for use as directional antenna 102 (FIG. 1), although other antenna configurations may also be suitable. Sectorized antenna 502 may comprise a plurality of individual directional antennas for communicating within a corresponding one of sectors 501. In some embodiments, first sector 501A may correspond to first direction 101A (FIG. 1). Second sector 501B may correspond to second direction 101B (FIG. 1). Third sector 501C may correspond to third direction 101C (FIG. 1).

Referring to FIGS. 1 and 5, when transmitting in first direction 101A, a transmitting station may transmit using a first of the individual directional antennas associated with first sector 501A. The first of the individual directional antennas may be directed in first direction 101A. When transmitting in second direction 101B, the transmitting station may transmit using a second of the individual directional antennas associated with second sector 501B. The second of the individual directional antennas may be directed in second direction 101B. When transmitting in third direction 101C, the transmitting station may transmit using a third of the individual directional antennas associated with third sector 501C. The third of the individual directional antennas may be directed in third direction 101C.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for transmitting packets at millimeter-wave frequencies for fast link recovery, the method comprising:
    transmitting a packet at millimeter-wave frequencies within a periodic reservation with a highly-directional antenna in a first direction to a receiving station;
    when an acknowledgement is not received from the receiving station acknowledging the transmitted packet after a predetermined number of retransmission attempts in the first direction, retransmitting the packet in a second direction within the periodic reservation; and
    when an acknowledgement from the receiving station is received in the second direction in response to the retransmitting in the second direction, updating directional information for the receiving station for subsequent communications in the second direction.

2. The method of claim 1 wherein when the acknowledgement from the receiving station is not received in the second direction after a predetermined number of retransmission attempts in the second direction, the method further comprises retransmitting the packet in a third direction within the periodic reservation, and
    wherein the second and third directions are on opposite sides of the first direction in a horizontal plane.

3. The method of claim 2 further comprising after retransmitting the packet in the second direction, waiting for the acknowledgement from the receiving station in the second direction by receiving in the second direction with the directional antenna.

4. The method of claim 3 further comprising after retransmitting the packet in the third direction, waiting for an acknowledgement from the receiving station in the third direction by receiving in the third direction with the directional antenna.

5. The method of claim 4 wherein the receiving station is configured to attempt to receive the packet within the periodic reservation from the transmitting station at least a number of times equaling the predetermined numbers of retransmissions by a transmitting station in the first, second and third directions.

6. The method of claim 3 wherein transmitting in the first direction comprises applying a first set of beamforming coefficients to direction-steering circuitry to generate millimeter-wave transmissions in the first direction;
    wherein retransmitting in the second direction comprises applying a second set of beamforming coefficients to the direction-steering circuitry to generate millimeter-wave transmissions in the second direction, and
    wherein retransmitting in the third direction, when performed, comprises applying a third set of beamforming coefficients to the direction-steering circuitry to generate millimeter-wave transmissions in the third direction.

7. The method of claim 6 wherein receiving in the second direction with the directional antenna comprises applying the second set of beamforming coefficients to the direction-steering circuitry to receive millimeter-wave transmissions from the second direction.

8. The method of claim 3 wherein the directional antenna is a sectorized antenna comprising a plurality of individual directional antennas for communicating within a corresponding one of a plurality of sectors,
    wherein transmitting in the first direction comprises transmitting using a first of the individual directional antennas associated with a first sector, the first of the individual directional antennas being directed in the first direction,
    wherein transmitting in the second direction comprises transmitting using a second of the individual directional antennas associated with a second sector, the second of the individual directional antennas being directed in the second direction, and
    wherein transmitting in the third direction comprises transmitting using a third of the individual directional antennas associated with a third sector, the third of the individual directional antennas being directed in the third direction.

9. The method of claim 4 wherein when an acknowledgement from the receiving station is received from the third direction, the method further comprises updating directional information for the receiving station for subsequent communications in the third direction, and
    wherein when the acknowledgement from the receiving station is not received from the third direction after a predetermined number of retransmission attempts in the third direction, the method further comprises dropping the packet and initiating a device discovery process.

10. The method of claim 1 wherein prior to transmitting the packet in the first direction to the receiving station, the method comprises:
    performing a device discovery process to identify a direction associated with the receiving station; and
    updating directional information for the receiving station for subsequent communications with the receiving station in the identified direction.

11. The method of claim 1 wherein the directional antenna is a phased-array antenna.

12. The method of claim 1 wherein the transmissions and retransmissions by the directional antenna are transmitted on a first frequency channel, and
    wherein the acknowledgements are received on a second frequency channel orthogonal to the first frequency channel.

13. The method of claim 1 wherein the transmissions and retransmissions by the directional antenna are transmitted on a frequency channel within first time slots, and wherein the acknowledgements are received on the frequency channel within second time slots orthogonal to the first time slots.

14. The method of claim 1 wherein the transmissions and retransmissions by the directional antenna comprise single-carrier transmissions.

15. The method of claim 1 wherein the transmissions and retransmissions by the directional antenna comprise orthogonal frequency division multiplexed (OFDM) transmissions.

16. A communication station for transmitting packets at millimeter-wave frequencies comprising:

direction-steering circuitry coupled to a highly-directional antenna; and a system controller to cause the direction-steering circuitry to transmit a packet at millimeter-wave frequencies within a periodic reservation with the directional antenna in a first direction to a receiving station, wherein when an acknowledgement is not received from the receiving station acknowledging the transmitted packet after a predetermined number of retransmission attempts in the first direction, the system controller causes the direction-steering circuitry to retransmit the packet in a second direction within the periodic reservation, and wherein when an acknowledgement from the receiving station is received in the second direction in response to the retransmission in the second direction, the system controller updates directional information for the receiving station for subsequent communications in the second direction.

17. The communication station of claim 16 wherein when the acknowledgement from the receiving station is not received in the second direction after a predetermined number of retransmission attempts in the second direction, the system controller causes the direction-steering circuitry to retransmit the packet in a third direction within the periodic reservation, and wherein the second and third directions are on opposite sides of the first direction in a horizontal plane.

18. The communication station of claim 17 wherein after retransmission of the packet in the second direction, the system controller waits for the acknowledgement from the receiving station in the second direction by causing the direction-steering circuitry to receive in the second direction with the directional antenna.

19. The communication station of claim 18 wherein after retransmission of the packet in the third direction, the system controller waits for an acknowledgement from the receiving station in the third direction by causing the direction-steering circuitry to receive in the third direction with the directional antenna.

20. The communication station of claim 19 wherein a receiving station is configured to attempt to receive the packet within the periodic reservation from the communication station at least a number of times equaling the predetermined numbers of retransmissions by a transmitting station in the first, second and third directions.

21. The communication station of claim 18 wherein for transmissions in the first direction, the system controller applies a first set of beamforming coefficients to direction-steering circuitry to generate millimeter-wave transmissions in the first direction;

wherein for retransmissions in the second direction, the system controller applies a second set of beamforming coefficients to the direction-steering circuitry to generate millimeter-wave transmissions in the second direction, and wherein for retransmissions in the third direction, the system controller applies a third set of beamforming coefficients to the direction-steering circuitry to generate millimeter-wave transmissions in the third direction.

22. The communication station of claim 21 wherein when receiving in the second direction, the system controller applies the second set of beamforming coefficients to the directionsteering circuitry to receive millimeterwave transmissions from the second direction, and wherein when receiving in the third direction, the system controller applies the third set of beamforming coefficients to the direction-steering circuitry to receive millimeter-wave transmissions from the third direction.

* * * * *

UNITED STATES PATENT AND TRADEMARK OFFICE
CERTIFICATE OF CORRECTION

PATENT NO. : 7,652,624 B2  Page 1 of 1
APPLICATION NO. : 11/682658
DATED : January 26, 2010
INVENTOR(S) : Guoqing C. Li et al.

It is certified that error appears in the above-identified patent and that said Letters Patent is hereby corrected as shown below:

In column 12, line 36, in Claim 22, delete "directionsteering" and insert -- direction-steering --, therefor.

In column 12, line 36, in Claim 22, delete "millimeterwave" and insert -- millimeter-wave --, therefor.

Signed and Sealed this

Twentieth Day of April, 2010

David J. Kappos
*Director of the United States Patent and Trademark Office*